United States Patent [19]

Baggett et al.

[11] 4,215,371
[45] Jul. 29, 1980

[54] FRONT PORCH CLAMPING CIRCUIT

[75] Inventors: Richard S. Baggett, Plano; Carl E. Bumpas, Richardson, both of Tex.

[73] Assignee: Rockwell International Corporation, El Segundo, Calif.

[21] Appl. No.: 972,180

[22] Filed: Dec. 21, 1978

[51] Int. Cl.² ............................................. H04N 5/18
[52] U.S. Cl. ................................................. 358/172
[58] Field of Search ...................... 358/171, 172, 173; 307/237; 330/11

[56] References Cited

U.S. PATENT DOCUMENTS

| | | | |
|---|---|---|---|
| 3,003,028 | 10/1961 | Suhrmann | 358/172 |
| 3,145,263 | 8/1964 | Barnard | 358/172 |
| 3,246,080 | 4/1966 | Ritchey, Jr. | 358/172 |

*Primary Examiner*—Robert L. Richardson
*Attorney, Agent, or Firm*—H. Fredrick Hamann; Howard R. Greenberg; V. Lawrence Sewell

[57] ABSTRACT

A circuit is disclosed for establishing a reference level in a video signal which may include unwanted low frequency components. The circuit clamps the video signal to a selected level at a time corresponding to the front porch segment of the horizontal line synchronizing pulse. The clamping is carried out at the horizontal line rate, including during vertical blanking. A phase locked loop is employed to achieve synchronization with the front porch.

6 Claims, 5 Drawing Figures

FRONT PORCH CLAMPING CIRCUIT

BACKGROUND OF THE INVENTION

This invention relates to circuits for establishing a reference level in a video signal which may include unwanted low frequency components.

In producing a video display, it is important that certain portions of the video signal be at standard reference voltage levels. The video signal as received may depart from these levels either through various sources of error or because of a slowly varying backbround signal intentionally introduced upon transmission of the signal. It is known in the art that proper reference levels may be established by first passing the signal through A.C. coupling, then clamping the signal to a selected voltage value precisely at times when the signal should assume that value.

Conventional practice is to clamp the video waveform during a portion of the standard horizontal line synchronizing pulse known as the sync tip, the tip of the synchronizing pulse. If the waveform has been subject to distortion so that the sync tip has the wrong pulse height relative to the other portions of the waveform, then the whole waveform will be displaced when the sync tip is used as a reference level. Therefore, when the sync tip is used for clamping, circuitry is required which will first assure the proper height of the sync tip.

SUMMARY OF THE INVENTION

In the present invention it has been perceived that it would be possible to clamp the video signal during a portion of the horizontal line synchronizing pulse known as the "front porch." A circuit has been invented which has the capability of achieving the necessary synchronization with the front porch and then clamping the video signal during that time.

In a preferred embodiment, the synchronizing portion of the circuit detects the occurrence of the leading edge of the horizontal synchronizing pulse at the horizontal line rate, even during that portion of the video signal corresponding to vertical blanking. From this detected leading edge, circuitry including a phase locked loop achieves synchronization with the front porch portion of the video signal.

The front porch of the video signal should be at zero reference level. When it is clamped by the circuit of the invention to a zero reference level, distortions in the sync tip or other large amplitude portions of the signal tend to be confined only to the portion of the signal distorted. It is not cricital to the operation of the present invention that the magnitude of the sync tip pulse be highly accurate.

An additional benefit of the circuit of the invention is that when the video signal fails to be received, the circuit continues to provide a signal at zero reference level. By contrast, a conventional circuit, clamping on the sync tip, produces a shift in the level of its output when the sync tip is not present.

DESCRIPTION OF A PREFERRED EMBODIMENT

Figure 1:
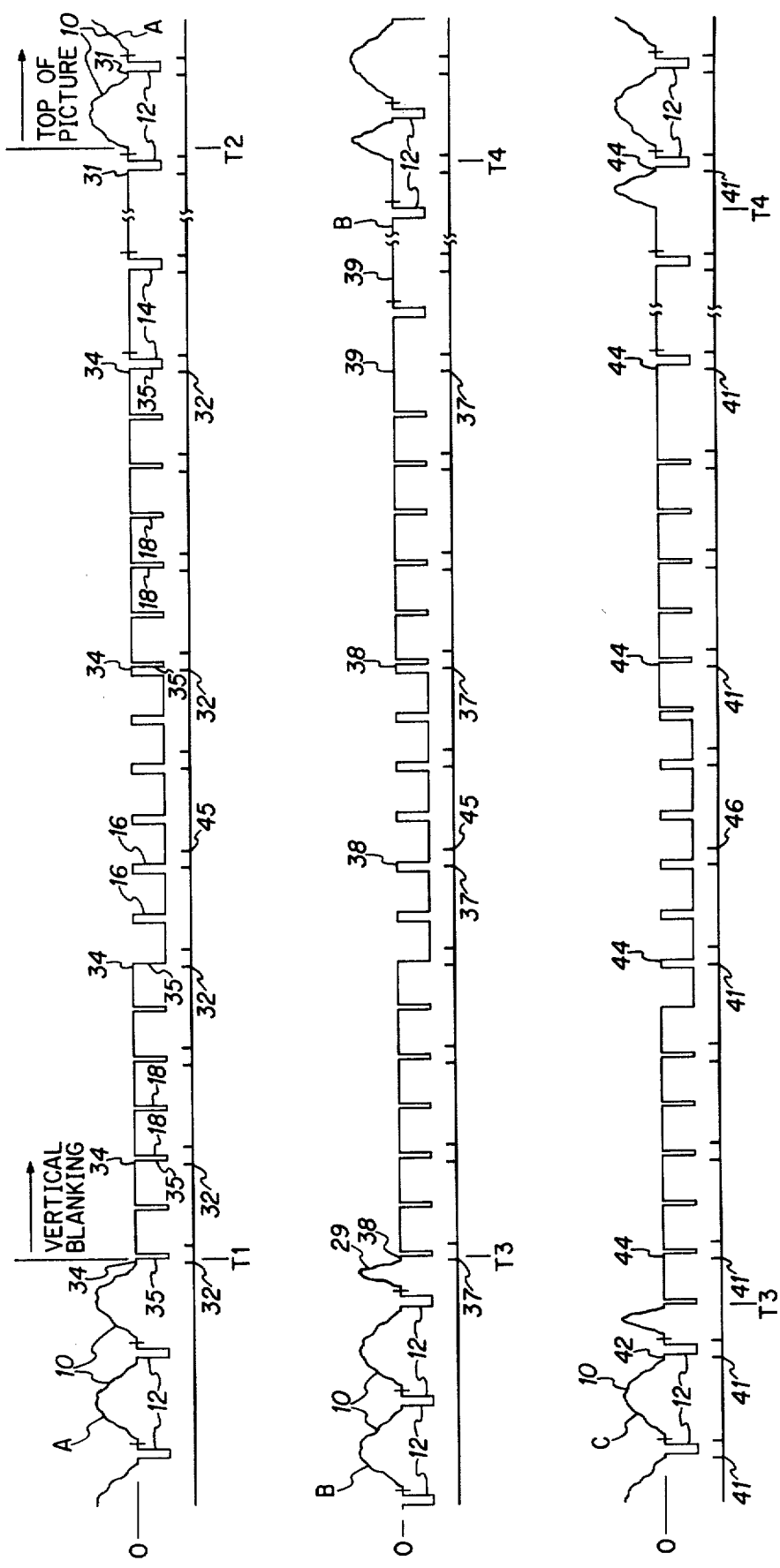
FIG. 1 is a set of video signal waveforms of the kind processed by the circuit of the invention.

FIG. 1 shows three video waveforms of the type processed by a circuit according to the invention. In waveform A, that part of the signal after time T1 is one of the odd numbered interlaced scans. In waveform B, the portion of the signal following time T3 is an even numbered scan. Waveform C is a shifted version of waveform B.

In waveform A, portions 10 represent luminance information occurring during the picture portion of the signal. The portions 10 are separated by horizontal line synchronizing pulses 12. The period from time T1 to time T2 is the vertical blanking interval. It includes further horizontal sync pulses 14, serrations 16 of the vertical synchronizing pulse, and equalizing pulses 18.

Figure 2:
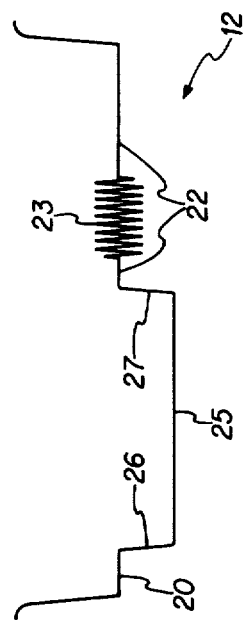
FIG. 2 is an expanded view of a portion of one of the waveforms of FIG. 1.

FIG. 2 shows an expanded view of one of the horizontal line synchronizing pulses 12. Various portions of the pulse are identified as follows. The first portion is the "front porch" 20. The last part is the "back porch" 22, which contains the color burst 23. The sync tip 25 is separated from the front porch by leading edge 26 and from the back porch 22 by a trailing edge 27. It is during the front porch 20 portion of the synchronizing pulse that the circuit of the present invention clamps a video waveform.

Referring again to FIG. 1, waveform B is a video signal for an even numbered scan. Note that the last horizontal line interval 29 just before the beginning of the vertical blanking interval at time T3, is only half as long as the other horizontal line intervals. This horizontal line scans only halfway across the video tube. Correspondingly, during the first horizontal scan at the top of the picture in waveform B, the picture information is included only for the last half of the horizontal scan, beginning at the end of horizontal blanking interval T4. Thus, vertical blanking ends in the middle of a horizontal line interval.

It is an important operation in the present invention to achieve synchronization with the front porch so that clamping may be initiated. During the picture portion of the video signal, that is, from time T2 to time T1 in waveform A, the front porch occurs at a regular interval just preceding the sync tip, as at instances 31 toward the end of waveform A. In waveform A, portions of the signal which are equivalent to the front porch also occur periodically after the beginning of the vertical blanking interval. These portions are indicated in waveform A by markers 32 which begin just before time T1 and repeat at the horizontal line rate. They mark the occurrence of a portion 34 of the waveform, which is required to be at a zero reference level, and which just precedes a leading edge 35 of a pulse. This can be treated as equivalent to the front porch segment of the horizontal synchronizing pulse which occurs during the picture portion of the waveform.

During the even scan seen in waveform B, the occurrence of a front porch portion is not periodic, beginning with the beginning of the vertical blanking interval at time T3. As periodic marks 37 emphasize, there are some portions 38 which may be treated as equivalent to the front porch, but some parts 39 are not. The portions 39 are at the required zero reference level, but do not immediately precede a leading edge of a pulse.

In waveform C, periodic markers 41 do not begin just before time T3. Instead, they are synchronized with the front porch during the picture portion of the waveform, as at portion 42 just preceding the vertical blanking interval. Then the marks 41 continue on into the vertical blanking interval, with a period equal to the horizontal line interval. The result is that portions 44, which may be treated as front porch portions, occur in coincidence with each of the markers 41 throughout the vertical blanking interval, and on into the picture portion of the waveform.

Thus, throughout the video signal, during even and odd sweeps, there is a portion equivalent to the front porch, which occurs periodically at the horizontal line rate. It is important to note that this is not true of the back porch of the horizontal line synchronizing pulse. For example, at time 45 during the vertical blanking interval of waveforms A and B and at time 46 of waveform C, the waveform does not return to zero reference level as is required of the back porch.

Figure 3:
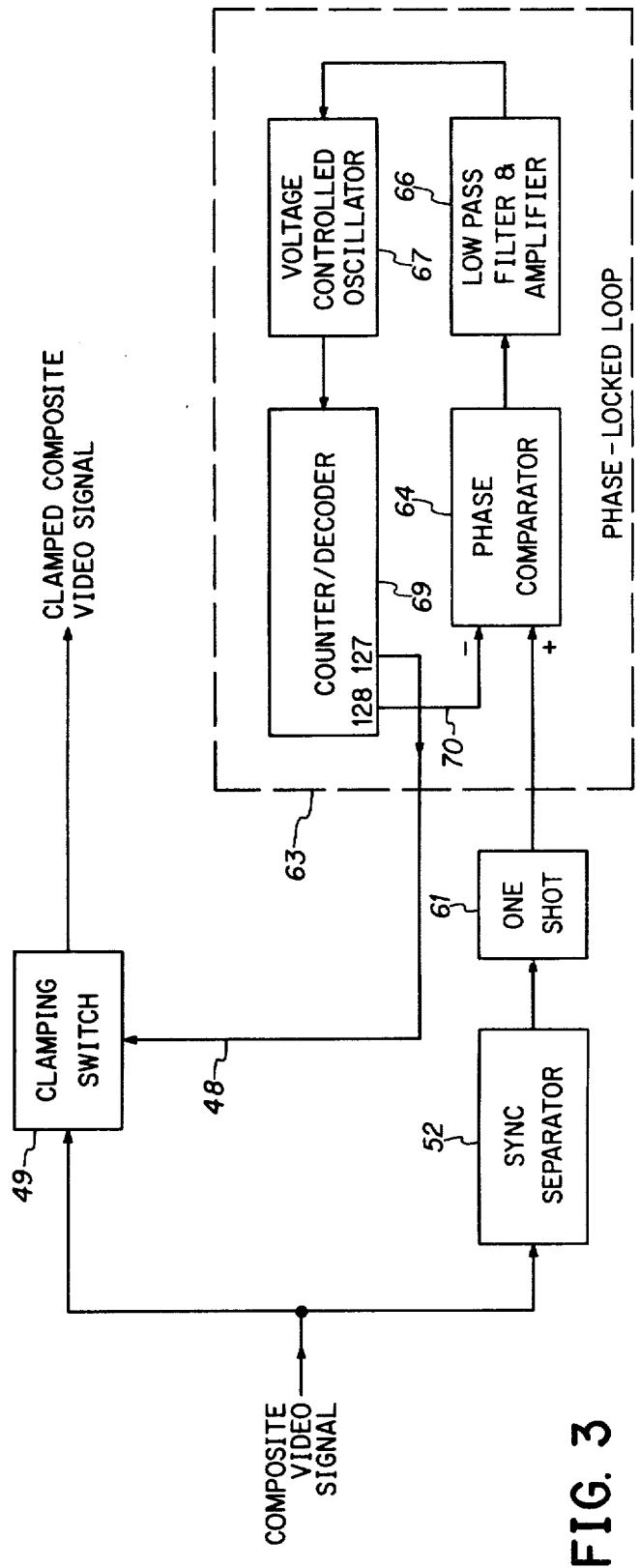
FIG. 3 is a block diagram of a video clamping circuit according to the invention.

FIG. 3 shows a block diagram of a clamping circuit according to the invention. Most of the blocks in the diagram are circuitry for synchronizing with the front porch part of the video signal. A resulting synchronizing pulse is applied to input 48 of a clamping switch 49 to clamp the video signal for a brief period during the front porch.

The composite video signal, that is, the waveforms of FIG. 1, are input to a sync separator 52 which produces an output pulse upon the occurrence of the leading edge of the pulse following the front porch. During the picture portion of the video signal, this is the leading edge of the horizontal sync pulse, and much of the following description will be phrased in terms of detecting the sync pulse. However, as can be seen in waveform A of FIG. 1, it is also necessary for sync separator 52 to detect leading edges 35 throughout the vertical blanking interval.

Figure 4:
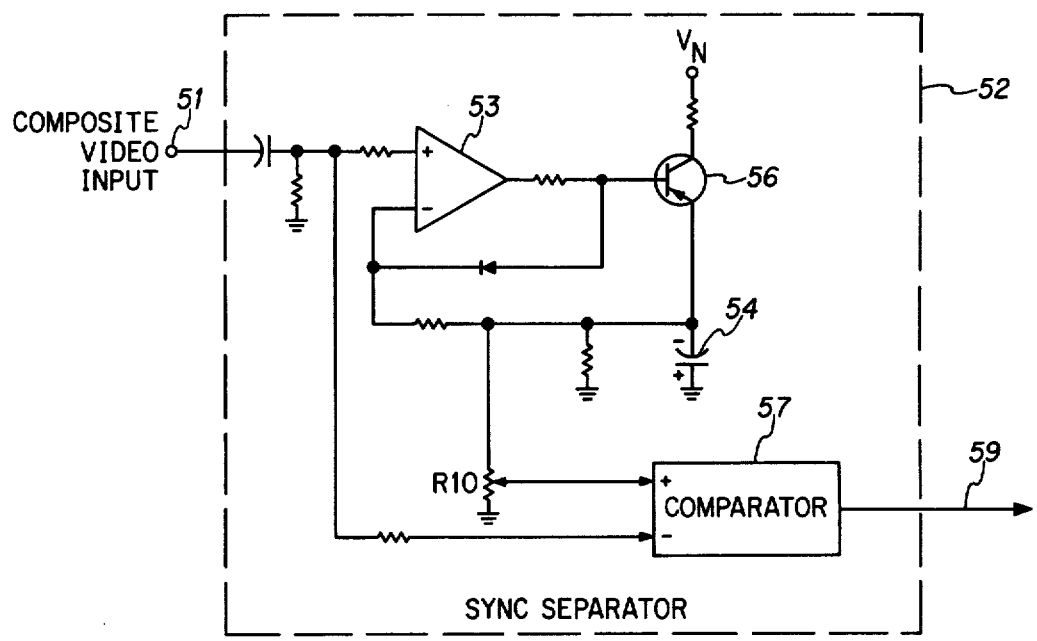
FIG. 4 is a schematic diagram of a sync separator for use in the circuit of FIG. 3.

Sync separator 52 can be of a conventional design; however, FIG. 4 shows a preferred separator circuit. The composite video input signal is applied to input terminal 51 of sync separator 52. Peak detector circuitry, including an operational amplifier 53 derives the peak negative excursion of the video signal. During the picture portion of the video signal, this is the sync tip 25, seen in FIG. 2. The negative peak detected is stored in capacitor 54, which is coupled to the output of amplifier 53 by an emitter follower including transistor 56. Whenever the video signal 51 and the output of amplifier 53 become more negative than the voltage on capacitor 54, transistor 56 turns on, charging the capacitor. Then, for as long as the video signal and output of amplifier 53 are above the voltage stored on capacitor 54, transistor 56 is biased off. Thus, capacitor 54 is repeatedly charged toward the peak negative waveform of the video signal, for example, the sync tip, and holds that voltage for as long as permitted by the time constants of the circuit.

The voltage from capacitor 54 is connected across a potentiometer R10 to permit selection at the wiper thereof of a fraction of the stored peak voltage. The voltage from the wiper is applied to one input of a comparator 57, and the video output signal is applied to the other input of the comparator. The comparator 57 produces a pulse at its output 59 when the video signal becomes more negative than the fraction of the sync tip at the wiper of potentiometer R10. The output 59 of comparator 57 comprises the output of the sync separator 52.

Thus, the sync separator 52 measures the height of the sync tip and uses a fraction of the measured value as a crossover point for detection of the leading edge between the front porch and sync tip. Therefore, if there is a substantial variation in the amplitude of the sync pulse, it will be taken into account by the operation of the sync separator.

The output of sync separator 52 is applied to the input of one shot circuit 61. One shot 61 should have an output pulse width less than the horizontal line period but greater than one half that period, and should be nonretriggerable during the occurrence of the output pulse. When a signal such as waveform A of FIG. 1 is applied to sync separator 52, each of the leading edges 35 of the horizontal sync pulses 12, the equalizing pulses 18 and the vertical sync pulses 16 causes an output pulse to be generated by sync separator 52. However, since one shot 61 has a period greater than the horizontal line period, the one shot will be triggered upon the occurrence of the video pulse at the beginning of the vertical blanking interval (in waveform A) but not by the next pulse, which occurs only one half the horizontal line period away. The one shot 61 will be ready for retriggering upon the occurrence of the third pulse in the vertical blanking interval. Thus, the output of one shot 61 is a train of pulses occurring at the horizontal line rate throughout the vertical blankng interval as well as during the picture portion of the video signal.

The output of one shot 61 is applied to a phase locked loop 63 which comprises a phase comparator 64, low-pass filter and amplifier 66, voltage controlled oscillator 67 and counter/decoder 69. According to principles well understood in the art, phase comparator 64 compares an output from counter/decoder 69 with the output of one shot 61. Comparator 64 produces an output signal which is proportional to the difference in phase between the digital inputs from counter/decoder 69 and one shot 61. Low-pass filter and amplifier 66 smooths the output of comparator 64 before applying it to voltage controlled oscillator 67. A suitable break frequency for for the low-pass filter is 500 Hz. In a preferred embodiment, counter/decoder 69 counts output pulses from oscillator 67 and upon the occurrence of every one hundred and twenty-eighth pulse, outputs a pulse to phase comparator 64. The effect is to divide the output frequency of oscillator 67 by 128.

Phase locked loop 63 locks onto the output of one shot circuit 61, so that the output 70 of counter/decoder 69 has the same frequency and phase as the one shot output. Thus, pulses at output 70 are locked to those leading edges 35 in video waveform A of FIG. 1 which occur at the horizontal line rate. When the loop is in the locked condition, the output of oscillator 67 has, in the example given, a frequency 128 times the horizontal line rate. In accordance with this frequency, counter/decoder 69 produces a second output upon each 127th counted pulse from voltage controlled oscillator 67.

The second output of counter/decoder 69 goes to input 48 of clamping switch 49. Since the output 70 of counter/decoder 69, based on the 128th counted oscillator pulse, is synchronized with the leading edge of the horizontal line sync pulse, the input 48 to the clamping switch 49 occurs just before the leading edge. Thus, the counter/decoder output pulse applied to clamping switch 49 is timed to occur during the front porch of the horizontal line synchronizing pulse. It should be apparent that some design variation is possible in the number of oscillator pulses counted by counter/decoder 69 and in the particular pulse used to actuate clamping switch 49. It is, however, important that the pulse used to actuate clamping switch 49 occur during the front porch and reliably so.

Phase comparator 64 can be, for example, an integrated circuit such as a 11C44 by Fairchild Semiconductor. Voltage controlled oscillator 67 can be the integrated circuit MC4024 by Motorola Inc. The counter/decoder 69 can be designed to provide the desired outputs on the 127th and 128th counted pulses with two 74LS293 counters of Texas Instruments Incorporated. A NAND gate can decode the occurrence of the 127th pulse to be output to clamping switch 48.

Figure 5:
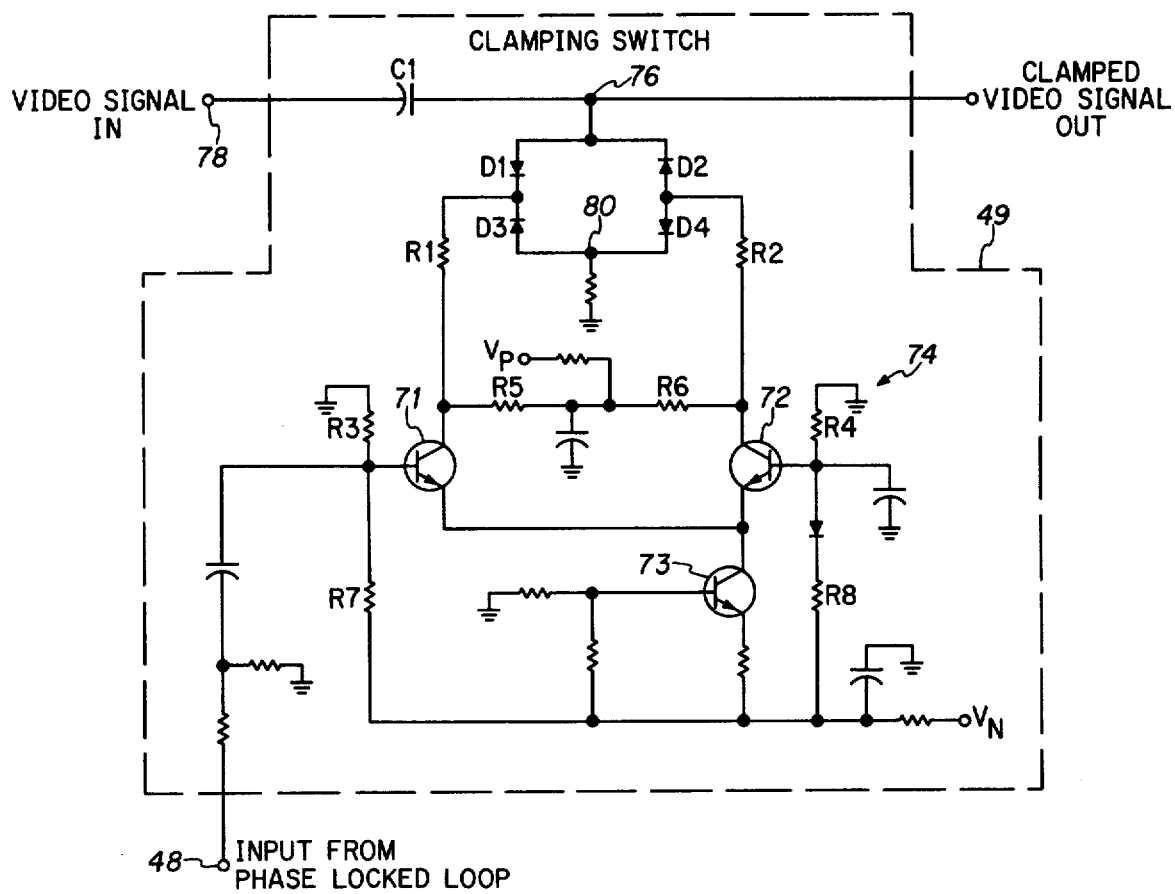
FIG. 5 is a schematic diagram of a clamping switch for use in the circuit of FIG. 3.

FIG. 5 shows details of clamping switch 9. It includes a balanced amplifier 74, employing transistors 71, 72 and 73, which drives diodes D1-D4. Resistors R1, R5 and R7 have the same values as resistors R2, R6 and R8, respectively. Transistor 73 controls a constant current which is to be switched between the two sides. Resistor R4 is somewhat less than resistor R3, so that the two sides of the amplifier are closely matched. Transistor 72 is biased toward turn on slightly more than transistor 71. As a result, in the absence of a pulse at input 48, the constant current from transistor 73 is switched entirely to transistor 72, leaving transistor 71 off.

With transistor 71 off, its collector voltage is the positive supply voltage $V_p$. The value of R6 can be chosen in relation to the current from transistor 73 so that the collector voltage of transistor 72 in this state is equal to $-V_p$. With the collector of transistor 71 at $+V_p$ and the collector of transistor 72 at $-V_p$, all of the diodes D1-D4 are back biased, so long as the video signal at circuit point 76 does not exceed the range of $-V_p$ to $+V_p$. Accordingly, the circuit point 76 is isolated from the voltages of the balanced amplifier and free to follow the video signal coupled to point 76 from input 78 through a capacitor C1. That is, in this condition, the video signal is not clamped.

When a positive pulse is applied from phase locked loop 53 to the input 48 of clamping switch 49, transistor 71 is switched on and transistor 72, off. In this condition, the circuit points 76 and 78 are at ground potential. The collector voltage of transistor 72 is above ground only by the amount of the voltage drop across diodes D2 and D4, and an even smaller voltage across resistor R2. Similarly, the collector voltage of transistor 71 is below ground approximately by the amount of the voltage drop across diodes D1 and D3. Preferably, the diodes D1-D4 are all closely matched, so that circuit point 76 is assured to be at the same voltage as point 80. It is in this state that circuit point 76 is clamped to a reference potential, ground, during the front porch.

Transistors 71-73 can be realized using an integrated circuit No. CA3049T of RCA. The diodes D1-D4 can be, for example, a 5082-2805 matched set by Hewlett-Packard Corporation. With these components, $V_p$ can be +5 volts while $V_n$ is −12 volts.

Thus, the circuit of FIG. 3 discloses a switch for clamping a video signal to a reference level upon the occurrence of a synchronizing pulse. This pulse is timed to occur during the front porch of the horizontal line synchronizing pulse of the video signal. To accomplish the synchronization with the front porch, a phase locked loop is used to generate a pulse at the horizontal line rate and locked in phase with the horizontal synchronizing pulse, continuing even during the vertical blanking interval. A counter is used to precisely count from the occurrence of the phase locked loop pulse to the occurrence of the front porch.

In the circuit of the invention, clamping occurs during the front porch, rather than at the sync tip as conventionally done. Therefore, it is not important that the magnitude of the sync tip be highly accurate.

Although preferred embodiments of the invention have been described in detail, it is to be understood that various changes, substitutions and alternations can be made therein without departing from the spirit and scope of the invention as defined by the appended claims.

We claim:

1. A circuit for establishing a reference level in a video signal having repetitive features including a sync tip characterized by the signal assuming a first level, a front porch wherein the signal assumes a second level just preceding the sync tip, and a leading edge connecting the front porch and sync tip, the occurrence of said sync tip outside of a vertical blanking interval establishing a horizontal line period and rate, said circuit comprising:

means, responsive to said video signal, for synchronizing with a period of time in said front porch before the leading edge of the sync tip, and means, actuated by the synchronizing means, for clamping said video signal to a selected level during said period of time.

2. The circuit of claim 1, wherein said synchronizing means includes means for detecting said leading edge at the horizontal line rate, including during the vertical blanking interval, means for generating a first number of oscillations between each detecting of the leading edge, and means for counting said oscillations to initiate said clamping upon the occurrence of a second number of oscillations smaller than said first number.

3. The circuit of claim 1, wherein said synchronizing means includes means for performing said synchronizing even during said vertical blanking interval, and said clamping means includes means for clamping said video signal to the correct reference level even during said vertical blanking interval.

4. A circuit for establishing a reference level in a video signal having repetitive features including a sync tip characterized by the signal assuming a first level, a front porch wherein the signal assumes a second level just preceding the sync tip, and a leading edge connecting the front porch and sync tip, the period between successive ones of said leading edges during the picture portion of the signal constituting a horizontal line period, said circuit comprising:

means for generating a first output upon the occurrence of each of said leading edges;

means, responsive to the occurrence of each of said first outputs, for generating a first pulse with a width less than said horizontal line period but greater than one half said period, except generating no additional pulse when one of said first outputs occurs during one of said first pulses;

phase detector means having first and second inputs, for providing an output indicative of the difference in phase between signals applied at the inputs thereof, said first input receiving said first pulses;

a low-pass filter having as input the output of said phase detector means;

a voltage controlled oscillator receiving a controlling voltage input from the output of the low-pass filter and providing a sequence of oscillations at the output of the oscillator;

means for counting the oscillations in the output of said oscillator and generating a second pulse upon each occurrence of a selected number of said oscillations and generating a third pulse upon each occurrence of a smaller selected number of said oscillations, said second pulse being applied to the second input of said phase detector means, whereby said phase detector means, low-pass filter, voltage controlled oscillator and means for counting form a phase locked loop, synchronizing said second pulse with said first pulse; and means for clamping said video signal to a selected level in response to said third pulse, whereby said smaller number can be selected to perform said clamping during the occurrence of the front porch.

5. A circuit for establishing a reference level in a video signal having repetitive features including a sync tip characterized by the signal assuming a first level, a front porch wherein the signal assumes a second level just preceding the sync tip, and a leading edge connecting the front porch and sync tip, the occurrence of said sync tip outside of a vertical blanking interval establishing a horizontal line period and rate, said circuit comprising:

means, responsive to said video signal, for synchronizing with the occurrence of said front porch, including means for detecting said leading edge at the horizontal line rate, including during the vertical blanking interval, and means for generating a pulse delayed from the detecting of said leading edge by a period nearly as long as the horizontal line period, said means for generating including a phase locked loop, with a first output synchronized to said detecting of the leading edge at the horizontal line rate and including means for generating a selected number of oscillations between each detecting of the leading edge, and means for counting a smaller selected number of said oscillations to initiate said delayed pulse, whereby the smaller number can be selected to generate the delayed pulse during the front porch of the video signal; and means actuated by the synchronizing means for clamping said video signal to a selected level for a period during the occurrence of said front porch.

6. A circuit for establishing sychronization in a video signal having repetitive features including a sync tip characterized by the signal assuming a first level, a front porch wherein the signal assumes a second level just preceding the sync tip, and a leading edge connecting the front porch and sync tip, the occurrence of said sync tip outside of a vertical blanking interval establishing a horizontal line period and rate, said circuit comprising:

means for detecting said leading edge at the horizontal line rate, including during the vertical blanking interval, and a phase locked loop, with a first output synchronized to said detecting of the leading edge at the horizontal line rate, said loop including means for generating a first number of oscillations between each detecting of the leading edge and means for counting a second smaller number of said oscillations to initiate a delayed pulse, whereby the smaller number can be selected to generate the delayed pulse at a selected time after the occurrence of said leading edge.

* * * * *